(12) United States Patent
Wierenga

(10) Patent No.: US 8,011,033 B2
(45) Date of Patent: Sep. 6, 2011

(54) AIRCRAFT SINK WITH INTEGRATED WASTE DISPOSAL FUNCTION

(75) Inventor: Scott M. Wierenga, Everett, WA (US)

(73) Assignee: The Boeing Company, Chicago, IL (US)

(*) Notice: Subject to any disclaimer, the term of this patent is extended or adjusted under 35 U.S.C. 154(b) by 527 days.

(21) Appl. No.: 10/907,625

(22) Filed: Apr. 8, 2005

(65) Prior Publication Data

US 2006/0225200 A1    Oct. 12, 2006

(51) Int. Cl.
*A47K 4/00* (2006.01)
(52) U.S. Cl. .......................................................... 4/664
(58) Field of Classification Search .............. 4/321, 323, 4/431, 664
See application file for complete search history.

(56) References Cited

U.S. PATENT DOCUMENTS

| 4,108,192 | A | * | 8/1978 | Michael .................... 4/661 X |
| 4,184,506 | A | * | 1/1980 | Varis et al. ................ 4/431 X |
| 4,791,949 | A | * | 12/1988 | Tank ........................ 4/431 X |
| 5,317,763 | A | | 6/1994 | Frank et al. |
| 5,396,668 | A | | 3/1995 | Haatanen et al. |
| 6,006,373 | A | * | 12/1999 | Hoang ............................. 4/431 |
| 6,012,678 | A | | 1/2000 | Hale et al. ................. 4/431 X |
| 6,223,361 | B1 | | 5/2001 | Rozenblatt ................ 4/431 X |
| 6,385,789 | B1 | | 5/2002 | Pondelick et al. |
| 2001/0011391 | A1 | | 8/2001 | Rozenblatt |

FOREIGN PATENT DOCUMENTS

DE    4131367 A1    3/1993
DE    20301649 U1   7/2004

OTHER PUBLICATIONS

Area Lands Another 7E7 Deal, Adam Lowenstein, Copyright 2004, 3 pgs.

* cited by examiner

*Primary Examiner* — Lori Baker
(74) *Attorney, Agent, or Firm* — Ostrager Chong Flaherty & Broitman

(57) ABSTRACT

A sink system includes a sink and a storage area receiving and storing matter from the sink. The storage area receives air from the bypass line during a flush. Also, matter from the storage area and sink is vacuumed through a common line during the flush. A valve limits an amount of air supplied by the bypass line such that increased suction is applied to the sink through the common line. The valve may be manually operated or operated by a controller.

7 Claims, 4 Drawing Sheets

AIRCRAFT SINK WITH INTEGRATED WASTE DISPOSAL FUNCTION

TECHNICAL FIELD

The present invention relates generally to sink systems, and more particularly to a sink system in an aircraft environment.

BACKGROUND OF THE INVENTION

In commercial aviation, it is necessary to dispose of unwanted fluids and solids. Currently, most commercial aircraft are equipped with galley and lavatory sinks; however, these sinks are primarily intended for the disposal of fluid waste only as they are connected to small diameter drain lines and drain primarily by gravity. These drains generally range from about one half to one inch in diameter and terminate at an aircraft drain mast for exhaustion to the atmosphere. Unfortunately, such sink systems are limited in their ability to dispose of more viscous liquid or solid waste products. Current sinks are also prone to blockage due to drainage of liquids that solidify when combined in the drain system.

Currently, disposal of most non-liquid wastes is accomplished through conventional vacuum systems for toilets and waste disposal units. While generally effective for disposing of solid, liquid and slurry food wastes, implementing one of the conventional vacuum toilet or waste disposal unit designs requires incorporation of a separate unit in addition to the sink. While these designs provide an alternate location for solid waste disposal, they do not eliminate the potential for clogged sink drain lines.

A problem with incorporating current galley sink designs into a vacuum waste system relates to noise. A loud flushing sound is created when the flush valve opens and the differential pressure across it forcefully draws the waste down the drain. To reduce the noise during drainage, a by-pass line can be installed to control the amount of airflow passing through the sink bowl. The bypass line reduces the noise but also reduces the amount of vacuum available help drain the sink.

The disadvantages associated with current aircraft sink systems have made it apparent that a new technique for removing waste from an airplane sink is needed. The new technique should minimize noise onboard the aircraft and allow system clogs to be flushed out.

SUMMARY OF THE INVENTION

In accordance with one embodiment of the present invention, a sink system includes a sink and a storage area receiving and storing matter from the sink. The storage area receives air from the bypass line during a flush. Matter from the storage area and sink is vacuumed through a common line during the flush. A first valve limits an amount of air supplied by the bypass line such that increased suction is applied to the sink through the common line, and a first actuator operates the first valve.

In accordance with another embodiment. A method for operating a sink system coupled to a common waste disposal line with a second waste disposal system is included. The sink system has a storage area receiving matter from a sink, receiving air from a bypass line as regulated by a first valve, and expelling waste through the common line as regulated by a second valve. The method includes setting initial conditions of the first valve open and the second valve closed. The method further includes activating a vacuum blower generating a pressure differential across the second valve, thereby opening the second valve and emptying the matter from the storage area, whereby the second valve closes at an end of emptying the matter. An amount of air supplied by the bypass line is limited in the case of a clog in the system by closing the first valve, such that increased suction is applied to the sink through the common line activating the vacuum blower.

Current airplane galleys include sinks and galley waste disposal units as separate units. Combining the galley waste disposal function with the galley sink function through use of the previously discussed common line would save weight, cost and space in galley modules.

Additional advantages and features of the present invention will become apparent from the description that follows and may be realized by the instrumentalities and combinations particularly pointed out in the appended claims, taken in conjunction with the accompanying drawings.

BRIEF DESCRIPTION OF THE DRAWINGS

For a complete understanding of the invention, there will now be described some embodiments thereof, given by way of example, reference being made to the accompanying drawings, in which.

DETAILED DESCRIPTION

Figures 1, 4:
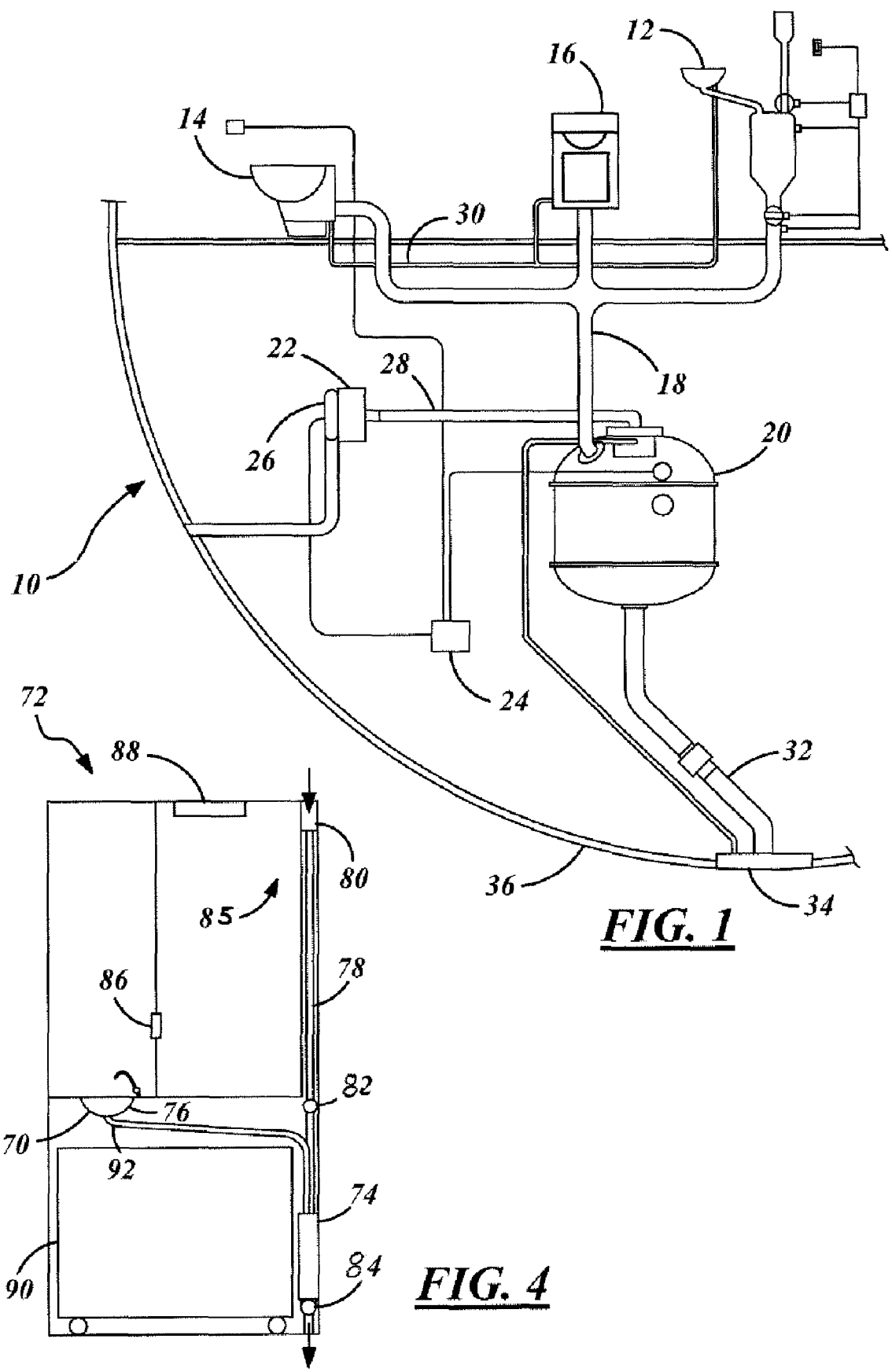
FIG. 1 is a schematic diagram of an airplane system including a sink system in accordance with one embodiment of the present invention.
FIG. 4 is schematic diagram of a sink system in accordance with another embodiment of the present invention.

The present invention is illustrated with respect to a sink system, particularly suited to the aerospace field. The present invention is, however, applicable to various other uses that may require sink systems, such as campers, railroad cars, buses, maritime vehicles, and other such vehicles, as will be understood by one skilled in the art. In each of the following figures, the same reference numerals are used to refer to the same components.

Referring to FIG. 1, an airplane system 10 including a sink system 12 is illustrated in accordance with one embodiment of the present invention. The system 10 further includes a toilet system 14 and a galley waste disposal system 16 disposing of matter (along with the sink system 12) through a common line 18. The common line 18 feeds into a tank assembly waste holding tank 20 and allows fluid and solid flow as a function of operation of a vacuum waste system 22.

The vacuum waste system 22 includes a controller 24 controlling a vacuum 26 which creates a pressure differential through vacuum lines 28. This vacuum waste system may include use of ambient pressure of the air outside of the aircraft or artificial source, such as a vacuum pump. Further, the sink system 12, the toilet system 14, and the galley waste disposal 16 receive water through rinse lines 30. Waste is expelled from the waste holding tank 20 via drain lines 32 through a service panel 34 on the exterior 36 of the aircraft system 10.

Figure 3:
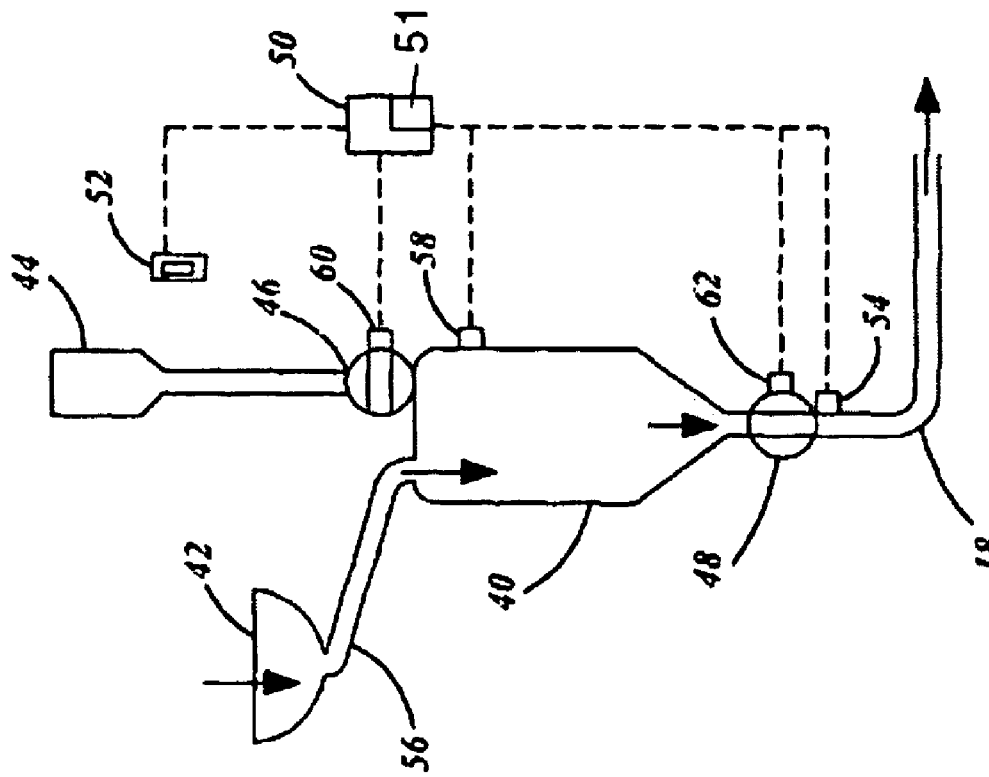
FIG. 3 is a schematic diagram of the sink system of FIG. 2 in operation.
Figure 2:
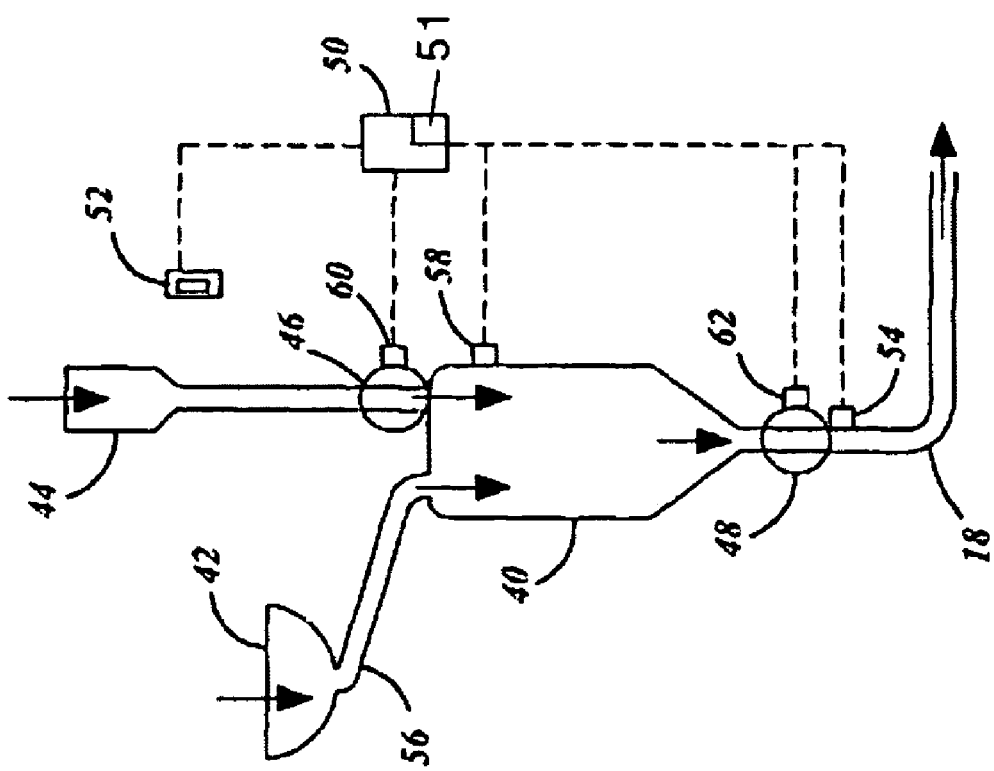
FIG. 2 is a schematic diagram of a sink system in accordance with another embodiment of the present invention.
Figure 5:
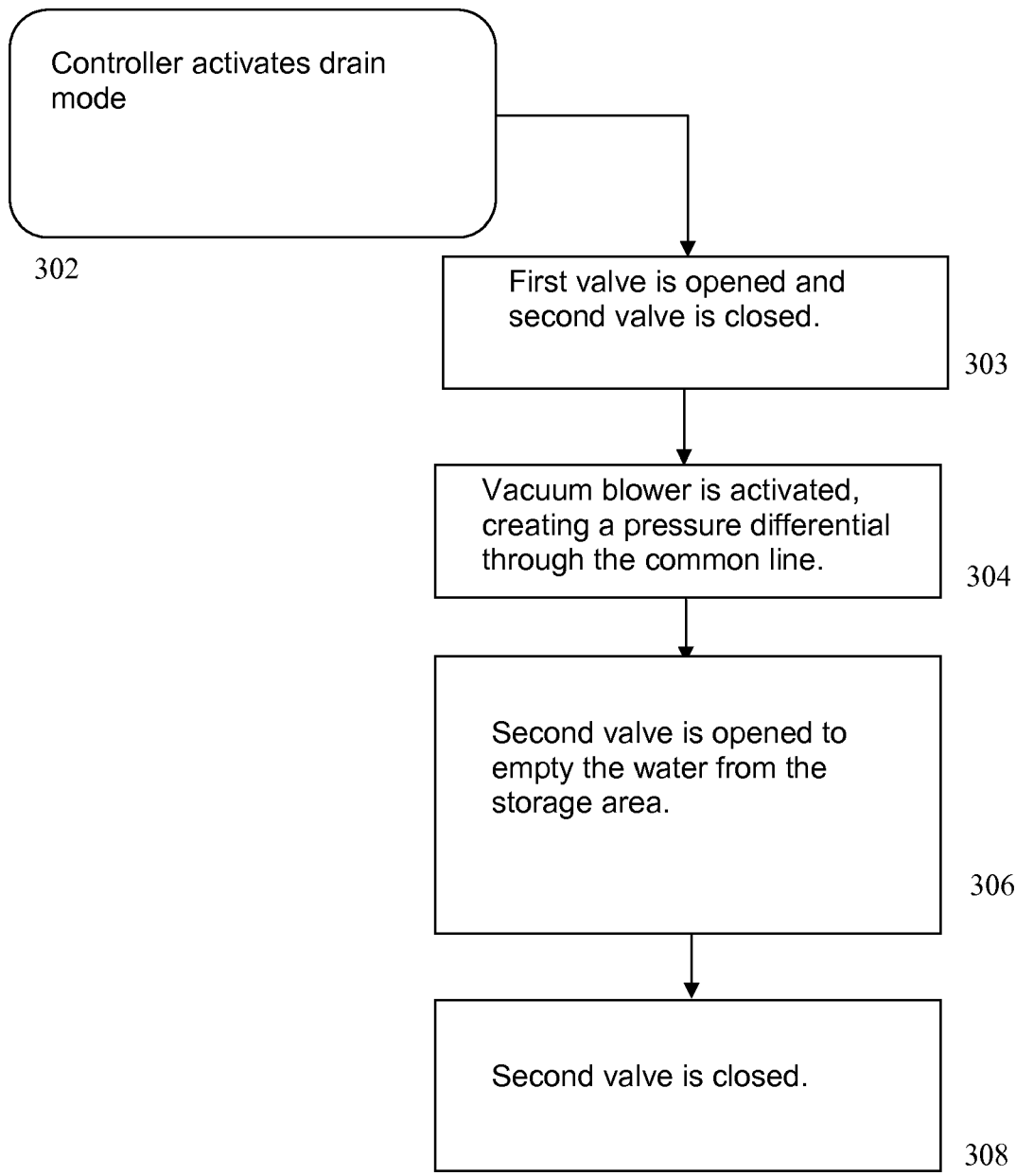
FIG. 5 is a flowchart depicting the algorithms for operating the system in a drain mode.

Referring to FIGS. 2 and 3, schematic diagrams of the sink system 12 are illustrated. The sink system 12 includes a storage area 40 receiving fluid from a sink 42 and air from a bypass line 44. The flow into and out of the storage area 40 is controlled by a disposal valve 46 (first valve) and a drain valve 48 (second valve), which are controlled by, for example, a controller 50 receiving signals from a disposal switch 52. Matter drains from the storage area 40 through the common line 18.

The sink 42 drains by gravity into the storage area 40 which may be a tank or an appropriately sized line. Waste water is retained in the storage area 40 by a normally closed second drain valve 48. The drain valve 48 is controlled automatically by the amount of water in the storage area 40 as detected by the level sensor 58 and by the pressure switch 54. The pressure switch 54 detects a clog as a function of the pressure differential across the second valve 48. The pressure switch 54 is required for use in a galley sink to prevent backflow.

The bypass line 44 provides a secondary path for air to enter the storage area 40 during a flush to limit noise inside the airplane galley area. The disposal valve 46 shuts off or limits the bypass line 44 causing more air flow and suction to be applied to the sink drain 56 to clear galley wastes or sink blockages. The disposal valve 46 and drain valve 48 manually activate through operation of the disposal mode switch 52.

The controller 50 includes algorithms 51 (control logic) for controlling vacuum blower operation and automatic and manual controls of valves. Coupled to the controller 50 is the disposal mode switch 52, which provides an airplane attendant with a manual means for activating the drain valve 48 in case of failure of the controller 50 or the automatic drain system or sink system 12. The controller may also activate a drain mode automatically as a function of signals received from the pressure switch 54.

The storage area 40 is a typical waste holding tank receiving matter from the sink 42 through the drain 56 and dispelling matter through the vacuum waste system. The storage area 40 is in direct communication, without obstruction, with the drain line 56, as shown in FIGS. 2 and 3. The level of the contents of the storage area 40 may be determined by a level switch 58 operably coupled to the controller 50. The controller may use this level information for control of the sink system 12. The storage area 40 includes two inlets, one from the drain 56 and one from the bypass line 44, and further includes an outlet through the common line 18. The inlet from the bypass line 44 is controlled by the first valve 46, and the dispelling of the matter through the common line 18 is conducted through the second valve 48. The first valve 46 may be controlled by an actuator 60 (first actuator) receiving signals from the controller 50. The second valve 48 may also be controlled by an actuator 62 (second actuator) receiving signals from the controller 50.

In another embodiment, the first valve 46 may be controlled manually by a handle 49 accessible to the user. A position sensor on the first valve sends a signal to the controller 50 to initiate the disposal mode.

Referring to FIGS. 2, 3, 5 and 6, the operation of a drain mode and disposal mode of the sink system 12 is illustrated in accordance with another embodiment of the present invention. To begin with, sink water drains by gravity into the storage area 40 and is held until the level switch 58 activates the drain mode through, for example, the controller 50 (step 302). The drain mode includes the first valve 46 open and the second valve 48 closed (step 303). The drain mode activates the vacuum blower, which is connected to the common line 18, in step 304) creating a pressure differential through the common line 18, which is verified by the pressure switch 54. In step 306, the second valve 48 is then opened to empty the water stored in the storage area 40. In step 308, the second valve 48 closes at the end of this sequence. During drainage of the sink 42, air enters the storage area 40 through the bypass line 44 and the sink 42 as illustrated in FIG. 2, and the air inlet is located above the sink 42. Further, during this operation, no action is required by a cabin attendant or airline attendant.

Figure 6:
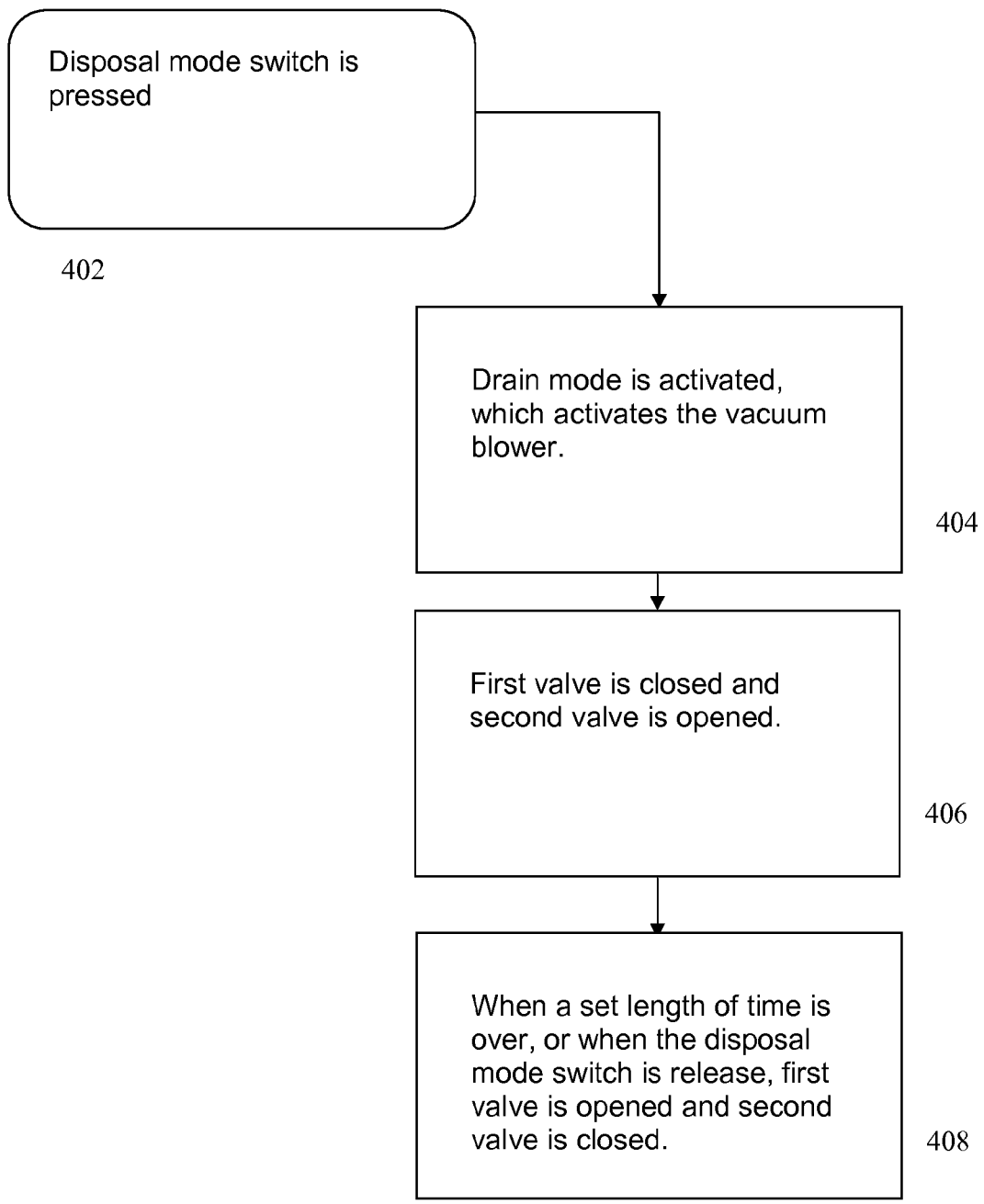
FIG. 6 is a flowchart depicting the algorithms for operating the system in a disposal mode.

Referring to FIGS. 3 and 6, the sink system 12 in disposal mode is illustrated in accordance with another embodiment of the present invention. In disposal mode, in step 402, the cabin attendant presses the disposal mode switch 52, thereby activating the drain mode in the controller 50, which activates the vacuum blower (step 404). The pressure switch 54 verifies that the vacuum blower is pulling materials through the common line 18, thereby completing the drain mode. The controller 50 then opens the second valve 48 and closes the first valve 46 (step 406), and at the end of the disposal mode, the first valve 46 opens and the second valve 48 closes (step 408).

During drainage in the disposal mode, air enters only through the sink 42 such that full vacuum system pressure will be applied to any blockages in all drain lines 56. The length of the disposal mode may be timed through a set length in the controller 50 or controlled by a press and hold switch such as the disposal mode switch 52.

Referring to FIG. 4, an alternate embodiment of a sink system 70 within a galley unit system 72 is illustrated in accordance with another embodiment of the present invention. The galley unit system 72 includes the storage area 74 receiving materials from the sink 76 and receiving air from the bypass line through the air inlet 80. As in the previous embodiments, the air inlet is located above sink 76 and the system 70 is controlled by two valves 82, 84 controlling the air inlet and the drainage of the storage area 74.

In accordance with this embodiment of the present invention, the storage area 74 may be sized to fit behind the galley carts 90 in the galley unit 72. Further, the drain valve or second valve 84 may be installed at the base of the storage area 74 and the outlet may be pumped to the vacuum waste system, as was discussed previously. Plumbing from the sink 76 may gravity drain into the storage area 74. The air inlet 80 to the bypass line 78 may be routed higher than the sink 76 and may also be routed to an overhead area 85 for minimizing noise in the cabin. The disposal valve or first valve 82 may be either installed at the storage area 74 or remotely. The disposal mode switch 86 may be installed in the galley unit 72 near the sink 76.

Further, other galley drains, for example the sump pump drains, may be either connected to the system 70 either directly to the storage area 74 or upstream of the first valve 82 to maintain the effectiveness of the aforementioned disposal mode. Odors from the storage area 74 may be vented through the lavatory galley vent system 88, which may be connected to the bypass line 78.

Through the aforementioned embodiment, a cart 90 is pushed underneath the sink for optimizing storage space. Further, an advantage is that every sink has disposal capabilities.

In operation, the sink system disposal mode will clear blockages in galley plumbing. Operation of the disposal mode of the sink system 70 provides manual backup to the sink drain 92 if failure of the automatic sink system 70 occurs.

In other words, the method includes setting initial conditions of the first valve open and the second valve closed. The method further includes activating a vacuum blower generating a pressure differential across the second valve, thereby opening the second valve and emptying the matter from the storage area, whereby the second valve closes at an end of emptying the matter. An amount of air supplied by the bypass line is limited in the case of a clog in the system by closing the first valve, such that increased suction is applied to the sink through the common line activating the vacuum blower.

From the foregoing, it can be seen that there has been brought to the art a new sink system. It is to be understood that the preceding description of one embodiment of the present invention is merely illustrative of some of the many specific embodiments that represent applications of the principals of the present invention. Numerous and other arrangements would be evident to those skilled in the art without departing from the scope of the invention as defined by the following claims.

What is claimed is:

1. An aircraft sink system with integrated waste disposal function for disposing of waste matter through a vacuum waste system, the sink system comprising:
    a common drain line;
    a sink for draining the waste matter through a sink drain line, said sink drain line being connected to said sink and used to drain material from said sink;
    a storage area in direct communication, without obstruction, with the sink drain line said storage area used for receiving and storing the waste matter from the sink;
    a bypass line for supplying air into the storage area;
    a vacuum blower connected to the common drain line, said vacuum blower able to apply suction on the common drain line to remove matter from the storage area;
    a first valve having an open position and a closed position for controlling the amount of air supplied by the bypass line into the storage area;
    a second valve having an open position and a closed position for restricting flow of the waste matter from the storage area when in the closed position and draining the waste matter from the storage area to the common line when in the open position; and
    a controller connected to said first valve and said second valve;
    the controller having control logic to direct operation of the system in a drain mode or a disposal mode;
    the control logic for directing operation of the system in the drain mode setting the first valve to the open position and the second valve to the closed position, activation the vacuum blower, and setting the second valve to the closed position to end the drain mode;
    the control logic for directing operation of the system in the disposal mode first activating the drain mode, which thereby activates the vacuum blower, setting the second valve to the open position and the first valve to the closed position and setting the first valve to the open position and the second valve to the closed position.

2. The aircraft sink system according to claim 1, wherein the controller is triggered to begin the drain mode as a function of signals from a pressure switch.

3. The aircraft sink system according to claim 1, wherein the controller is triggered to begin the drain mode in response to a signal from a manual switch or as a function of signals from a pressure switch.

4. The aircraft sink system according to claim 1, wherein the disposal mode lasts for a period of time either predetermined by the controller or until a manual switch is released.

5. The aircraft sink system according to claim 1, wherein the storage area is sized to fit behind a galley cart in a galley unit.

6. The aircraft sink system according to claim 1, wherein the controller is triggered to begin the drain mode as a function of signals from a level sensor.

7. The aircraft sink system according to claim 1, wherein the disposal mode lasts for a period of time either predetermined by the controller or until a manual switch is released.

* * * * *